(12) United States Patent
Iguchi

(10) Patent No.: US 9,100,625 B2
(45) Date of Patent: Aug. 4, 2015

(54) IMAGE PROCESSING APPARATUS, METHOD, AND PROGRAM PRODUCT FOR CORRECTING REPRODUCTION CHARACTERISTICS BASED ON DIFFERENCES BETWEEN FIRST AND SECOND FORMED CHARTS AND TARGET VALUES

(71) Applicant: CANON KABUSHIKI KAISHA, Tokyo (JP)

(72) Inventor: Shunsuke Iguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/132,692

(22) Filed: Dec. 18, 2013

(65) Prior Publication Data

US 2014/0176970 A1  Jun. 26, 2014

(30) Foreign Application Priority Data

Dec. 20, 2012 (JP) ................. 2012-278321

(51) Int. Cl.
  *H04N 1/40* (2006.01)
  *H04N 1/52* (2006.01)
  *G06K 15/02* (2006.01)
  *H04N 1/60* (2006.01)

(52) U.S. Cl.
  CPC .......... *H04N 1/6033* (2013.01); *G06K 15/1868* (2013.01); *G06K 15/027* (2013.01)

(58) Field of Classification Search
  None
  See application file for complete search history.

(56) References Cited

U.S. PATENT DOCUMENTS

| 5,838,465 A * | 11/1998 | Satou et al. ................... 358/504 |
| 6,262,810 B1 * | 7/2001 | Bloomer ....................... 358/504 |
| 6,556,793 B2 * | 4/2003 | Nakamura ...................... 399/15 |
| 7,227,668 B2 * | 6/2007 | Paul ............................. 358/504 |
| 8,804,217 B2 * | 8/2014 | Zaima .......................... 358/518 |
| 8,848,255 B2 * | 9/2014 | Sakatani ....................... 358/1.9 |
| 2007/0024657 A1 * | 2/2007 | Zhang et al. ................... 347/19 |

FOREIGN PATENT DOCUMENTS

JP  2010-263497 A  11/2010

* cited by examiner

*Primary Examiner* — Scott A Rogers
(74) *Attorney, Agent, or Firm* — Canon USA Inc. IP Division

(57) ABSTRACT

An image processing apparatus includes a first determination unit configured to determine whether a difference between the result of measuring a first chart formed by an image forming unit and a target value is larger than a first preset threshold value, and a control unit configured to, based on a result of determination by the determination unit, control execution of correction of reproduction characteristics of an image formed by the image forming unit by using the result of measuring a second chart formed by the image forming unit and the target value.

17 Claims, 19 Drawing Sheets

FIG.6

| SHEET GRAMMAGE RANGE FOR MEASUREMENT CHART (g/m²) | WAITING TIME FOR COOLING PER SHEET (SECONDS) |
|---|---|
| 50 – 100 | 0 |
| 101 – 150 | 10 |
| 151 – 200 | 20 |
| 201 – 350 | 30 |

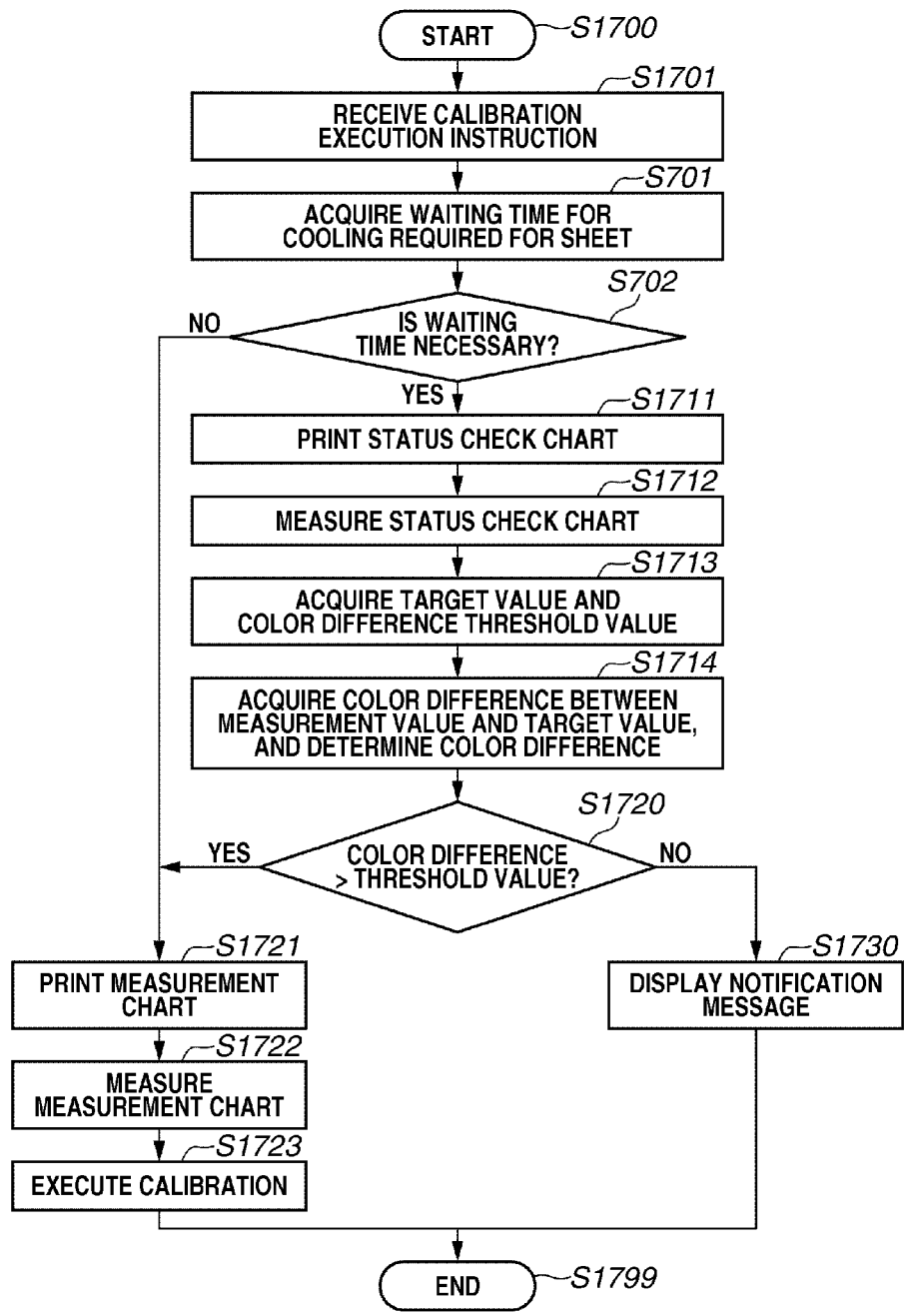

| SHEET TYPE: GLOSS COATED PAPER OF ABC PAPER CO. 250 g/m² |
|---|
| MEASUREMENT CHART TYPE: CALIBRATION |
| MEASUREMENT CHART COUNT: 12 |
| PERMISSIBLE COLOR DIFFERENCE (dE): N/A |

| PATCH NO. | PATCH CMYK VALUE | TARGET DENSITY VALUE | TARGET L*a*b* VALUE |
|---|---|---|---|
| A1 | 255, 0, 0, 0 | 1.5 | 60, -40, -51 |
| A2 | 250, 0, 0, 0 | 1.45 | 59, -38, -50 |
| A3 | 200, 0, 0, 0 | 1.41 | 59, -37, -49 |
| ⋮ | ⋮ | ⋮ | ⋮ |

| SHEET TYPE: GENERAL GLOSS COATED PAPER 201-300 g/m² |
|---|
| MEASUREMENT CHART TYPE: STATUS CHECK CHART |
| MEASUREMENT CHART COUNT: 1 |
| PERMISSIBLE COLOR DIFFERENCE (dE): 3.0 |

| PATCH NO. | PATCH CMYK VALUE | TARGET DENSITY VALUE | TARGET L*a*b* VALUE |
|---|---|---|---|
| A1 | 255, 0, 0, 0 | 1.5 | 60, -40, -50 |
| A2 | 200, 128, 0, 0 | N/A | 50, 0, -42 |
| A3 | 0, 99, 73, 20 | N/A | 76, 22, 16 |
| ⋮ | ⋮ | ⋮ | ⋮ |

FIG.10

| SHEET NAME | GRAMMAGE (g/m²) | SURFACE NATURE | ... | WAITING TIME FOR COOLING (SECONDS) |
|---|---|---|---|---|
| GLOSS COATED PAPER OF ABC PAPER CO. 250 g/m² | 250 | COATED PAPER | ... | 20 |
| XYZ Paper Uncoated 100lb. | 100 | PLAIN PAPER | ... | 0 |
| ⋮ | ⋮ | ⋮ | ... | ⋮ |

FIG.15

1501 —
CALIBRATION

COLOR DIFFERENCE FROM
TARGET VALUE: 1.15
NO GREAT NECESSITY OF CALIBRATION

WILL YOU STILL EXECUTE CALIBRATION?

END          EXECUTE

FIG.18

| CALIBRATION TYPE | MEASUREMENT CHART COUNT |
|---|---|
| STATUS CHECK CHART | 1 |
| MAIN SCANNING UNEVENNESS CORRECTION | 1 |
| MONOCHROMATIC CALIBRATION | 5 |
| MULTICOLOR CALIBRATION | 20 |
| AUTOMATIC ICC PROFILE GENERATION | 50 |

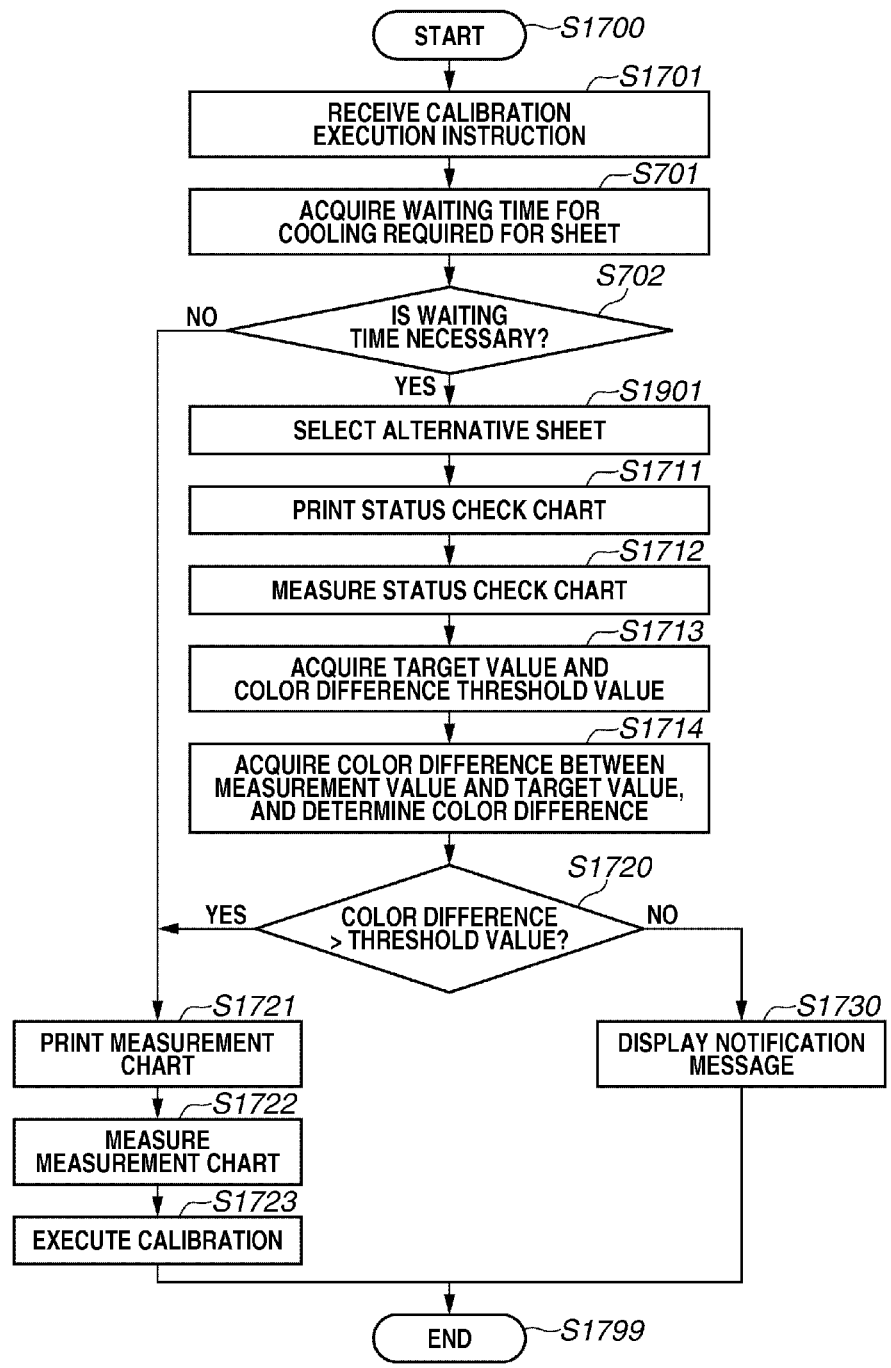

IMAGE PROCESSING APPARATUS, METHOD, AND PROGRAM PRODUCT FOR CORRECTING REPRODUCTION CHARACTERISTICS BASED ON DIFFERENCES BETWEEN FIRST AND SECOND FORMED CHARTS AND TARGET VALUES

BACKGROUND OF THE INVENTION

1. Field of the Invention

The present disclosure generally relates to image processing and, more particularly, to an image processing apparatus for correcting the color of an output image, an image processing method therefor, and a storage medium storing a program for generating image processing parameters.

2. Description of the Related Art

Calibration is performed for the purpose of preventing variation arising from various factors of an image processing apparatus, and stabilizing the reproduction characteristics including the color and gradation of an image output from the image processing apparatus. Conventionally, many techniques have been proposed for calibration as an image correction method for an image processing apparatus. Some of these techniques measure, by using a sensor, a measurement chart formed by an image processing apparatus, and perform feedback control so that the image processing apparatus is put in a desired state. The sensor for reading the measurement chart is a measuring apparatus, such as a densitometer and a spectroscopic measuring instrument.

By incorporating the measuring apparatus in a sheet conveyance path of the image processing apparatus, the measurement chart can be read without user's intervention when the sensor reads the measurement chart to measure the measurement chart. A certain technique automatically performs such calibration (Japanese Patent Application Laid-Open No. 2010-263497).

In particular, a calibration system using a spectral colorimetry sensor is capable of measuring not only monochrome, such as cyan, magenta, yellow, and black (CMYK), but also mixed-color (multicolor) represented by a combination of respective colors, thus enabling calibration with higher accuracy and generation of an International Color Consortium (ICC) profile. As used herein, "mixed-color" refers to a color produced by a plurality of toners. For example, the red, green, and blue colors are produced by using two out of the C, M, and Y colors. The gray color is produced by using the C, M, and Y colors.

In mixed-color calibration executed by using the result of measuring a measurement chart composed of mixed-color images, the color of images under measurement is formed of a combination of the C, M, Y, and K monochromatic colors. Therefore, in mixed-color calibration, the number of patch images measured on the measurement chart remarkably increases in comparison with that in conventional monochromatic calibration executed by using the result of measuring the measurement chart composed of the C, M, Y, and K monochromatic images.

For example, even if each of the C, M, Y, and K monochromatic colors is divided into only four gradations for measurement, a total of 256 combinations of patch images are required on the measurement chart used for mixed-color calibration.

Since mixed-color calibration requires measurement of a number of patch images in this way, execution of mixed-color calibration takes remarkably longer time than execution of monochromatic calibration.

Further, in many cases, an operator who operates an image processing apparatus periodically executes calibration for the purpose of preventing variation in the reproduction characteristics of an image output from the image processing apparatus. In this case, the operator periodically executes calibration even if the image processing apparatus actually does not show significant variation in the reproduction characteristics. In the case of mixed-color calibration in which a number of patch images are measured, if the operator executes calibration even if the image processing apparatus does not show significant variation in the reproduction characteristics, a large time loss will arise.

Further, there is a problem that it is difficult for the operator to immediately determine whether time-consuming mixed-color calibration is necessary.

SUMMARY OF THE INVENTION

According to an aspect of the present disclosure, an image processing apparatus includes a first determination unit configured to determine whether a difference between a result of measuring a first chart formed by an image forming unit and a target value is larger than a first preset threshold value, and a control unit configured to, based on a result of determination by the determination unit, control execution of correction of reproduction characteristics of an image formed by the image forming unit by using a result of measuring a second chart formed by the image forming unit and the target value.

According to another aspect of the present disclosure, it is possible to determine, before executing time-consuming calibration, whether execution of the calibration is necessary, and, if execution of the calibration is determined to be necessary, execute the calibration.

Thus, since the operator does not need to execute time-consuming calibration more than necessary, the time to execute calibration can be reduced.

Further features and aspects of the present disclosure will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the disclosure and, together with the description, serve to explain the principles of the disclosure.

FIG. 6 is a table illustrating a relation between a waiting time for cooling to read a measurement chart by the spectral colorimetry sensors and a sheet grammage range according to a fourth exemplary embodiment.

FIG. 7 is a flowchart illustrating control processing by a controller of an image processing apparatus according to the fourth exemplary embodiment.

FIG. 8A is a table illustrating a configuration of measurement patch images (hereinafter referred to as measurement patch image configuration table) for calibration to be measured by the spectral colorimetry sensors according to the exemplary embodiments, and FIG. 8B is a measurement patch image configuration table illustrating a configuration of measurement patch images for status check to be measured by the spectral colorimetry sensors according to the exemplary embodiments.

FIG. 10 illustrates a sheet database according to the exemplary embodiments.

FIG. 15 illustrates a UI screen displayed on an operation unit of the image processing apparatus according to the second exemplary embodiment.

FIG. 18 is a measurement chart count table illustrating a relation between the calibration type and the number of measurement charts according to the exemplary embodiments.

FIG. 19 is a flowchart illustrating control processing by a controller of an image processing apparatus according to a fifth exemplary embodiment.

DESCRIPTION OF THE EMBODIMENTS

Various exemplary embodiments, features, and aspects of the disclosure will be described in detail below with reference to the drawings.

The following exemplary embodiments do not limit the present disclosure to the ambit of the appended claims. Not all of combinations of the features described in the present exemplary embodiments are indispensable to the solutions for the present disclosure.

(Apparatus Configuration)

Figure 1:
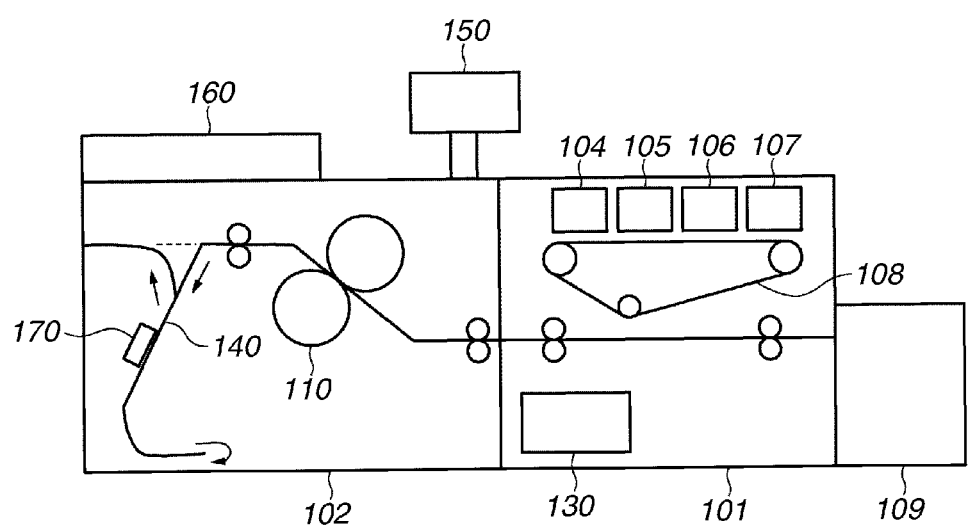
FIG. 1 is a block diagram illustrating an image processing apparatus according to exemplary embodiments.

FIG. 1 is a block diagram illustrating an image processing apparatus according to the present exemplary embodiment.

Although, in the present exemplary embodiment, an electrophotographic image processing apparatus will be described below, the present exemplary embodiment is also applicable to image processing apparatuses employing diverse image forming processes, such as the ink jet process and offset printing.

An image processing apparatus 100 includes a development station 101, a fixing station 102, and a paper feed deck 109. A job controller 130 is a control unit for managing control of various components. An operation unit 150 includes a liquid crystal display (LCD) and a touch panel. An operator of the image processing apparatus 100 is able to check printing statuses, and make various settings with the operation unit 150. A scanner 160 reads a document sheet and transmits image information to the job controller 130, thus achieving a copy function. In each of developing units 104, 105, 106, and 107 for C, M, Y, and K, an input image from the job controller 130 is developed on a photosensitive drum (not illustrated) included in each developing unit, and toner adheres to developed portions to form a toner image on the photosensitive drum. Each of the developed C, M, Y, and K toner images is transferred onto an intermediate transfer belt 108, and then transferred onto a sheet (recording medium) fed from the paper feed deck 109. Then, the sheet having a CMYK toner image transferred thereon in this way is conveyed to the fixing station 102, and heated and pressed by a fixing roller pair 110 of a fixing unit. This process melts toner to fix the toner image onto the sheet, completing the image forming process. If necessary, the sheet is reversed by a reversing unit 140 and then is discharged. A spectral colorimetry sensor 170 is disposed in the reversing unit 140 as a measurement unit. As used herein, the term "unit" generally refers to any combination of software, firmware, hardware, or other component that is used to effectuate a purpose.

Figure 2:
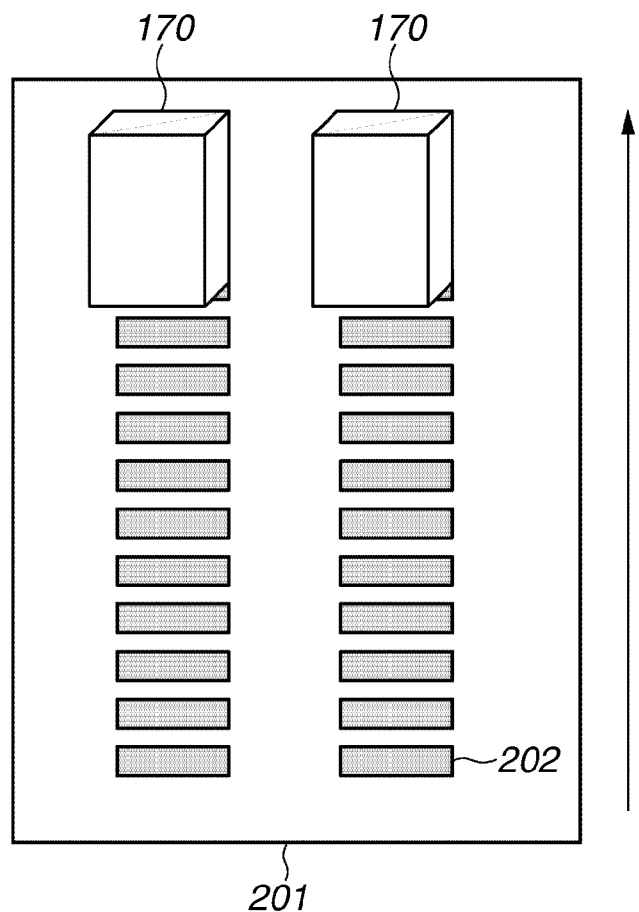
FIG. 2 illustrates a reading manner of a measurement chart by using spectral colorimetry sensors according to the exemplary embodiments.

FIG. 2 illustrates a measurement chart read by two spectral colorimetry sensors 170 according to the present exemplary embodiment.

Figure 3:
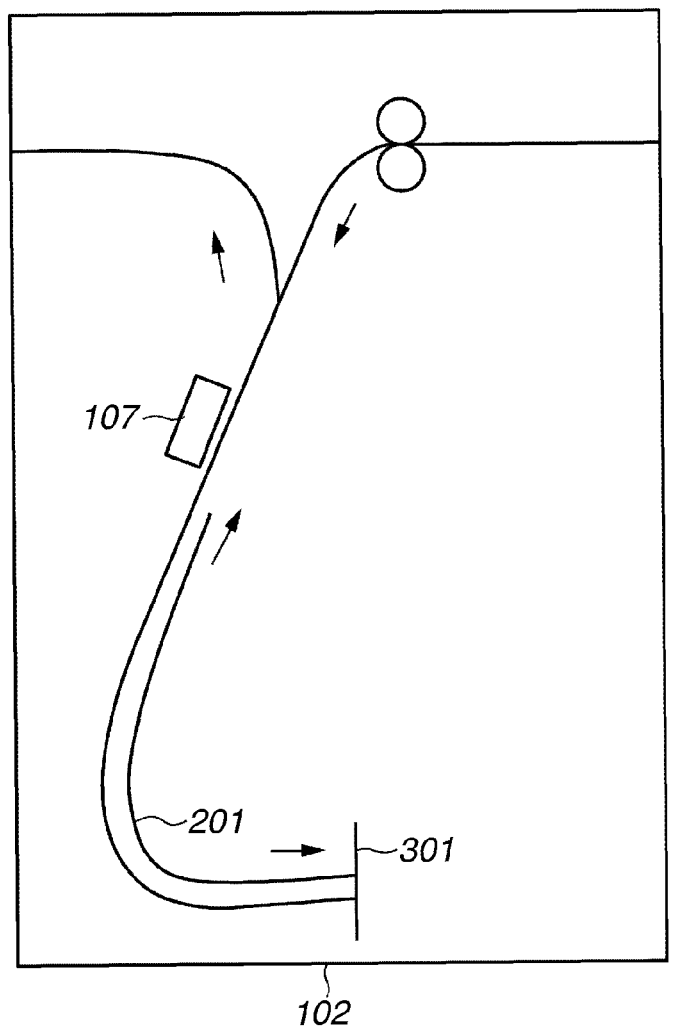
FIG. 3 is an enlarged view illustrating operations of a reversing unit of the image processing apparatus according to the exemplary embodiments.

FIG. 3 is an enlarged view illustrating operations of the reversing unit 140 of the image processing apparatus 100 according to the present exemplary embodiment. The spectral colorimetry sensors 170 disposed between the fixing unit and a discharge unit on the sheet conveyance path are capable of measuring an image on a sheet conveyed thereto. A plurality of spectral colorimetry sensors 170 can be disposed in parallel in the reversing unit 140.

After being conveyed along the sheet conveyance path and then fixed, the measurement chart is automatically read by the spectral colorimetry sensors 170 disposed in this way. Therefore, the user does not need to perform any particular operation to read the measurement chart.

When measuring the measurement chart having patch images formed thereon with the spectral colorimetry sensors 170, if the measurement chart is measured by the spectral colorimetry sensors 170 immediately after the measurement chart has passed a fixing unit, the measurement chart will be measured in a state where the chart has not dissipated the heat absorbed in the fixing process.

In this case, an error occurs in the result of chart measurement because of the effect of thermochromism. Thermochromism is a phenomenon in which the color of an object under measurement changes with the temperature of the object during measurement. This phenomenon occurs as a result of the change effected by fluorescent materials (such as a fluorescent whitening agent contained in the object under measurement), and the color change effected by non-fluorescent materials (such as a color material component).

Specifically, when measurement is performed by using the spectral colorimetry sensors 170, calibration will be performed based on the result of measuring the patch images having color which has changed due to the heat on the measurement chart. Thus, since correction is not appropriately performed on a product of the image processing apparatus 100, desired reproducibility for the product cannot be acquired. To avoid this problem, i.e., to measure the measurement chart while preventing the effect of thermochromism, measurement is performed after the measurement chart heated in the fixing process has been cooled. To cool the measurement chart, duration of time since the measurement chart is fixed in the image processing apparatus 100 until it is measured by the sensors 170 is controlled in order to dissipate the heat absorbed in the fixing process.

Specifically, methods for cooling the measurement chart include stopping the measurement chart in the conveyance path after fixing to allow natural heat to dissipate, delaying the conveyance speed of the measurement chart, and forcibly dissipating the heat absorbed by the measurement chart by using a cooling fan.

In the present exemplary embodiment, a method of stopping the measurement chart in the conveyance path after fixing is used.

In the present exemplary embodiment, two spectral colorimetry sensors 170 are disposed. A measurement chart 201 conveyed by the reversing unit 140 reaches an abutting plate 301 at the lower end of the reversing unit 140. If necessary, at this position, the measurement chart 201 is stopped for a predetermined duration of time, and the spectral colorimetry sensors 170 wait for completion of natural heat dissipation from the measurement chart 201. After waiting, the measurement chart 201 is switched back and conveyed. While the measurement chart 201 is being conveyed upward, the spectral colorimetry sensors 170 read measurement patch images 202 formed on the measurement chart 201.

The waiting time for cooling to prevent a measurement error resulting from the effect of thermochromism is determined by the grammage of the sheet. For example, in order to make heat of a sheet having a grammage of 350 g/m2 self-dissipated to a measurable temperature, it takes about 30 seconds. The waiting time for cooling will be described in detail below with reference to FIG. 10.

(Controller Configuration)

Figure 4:
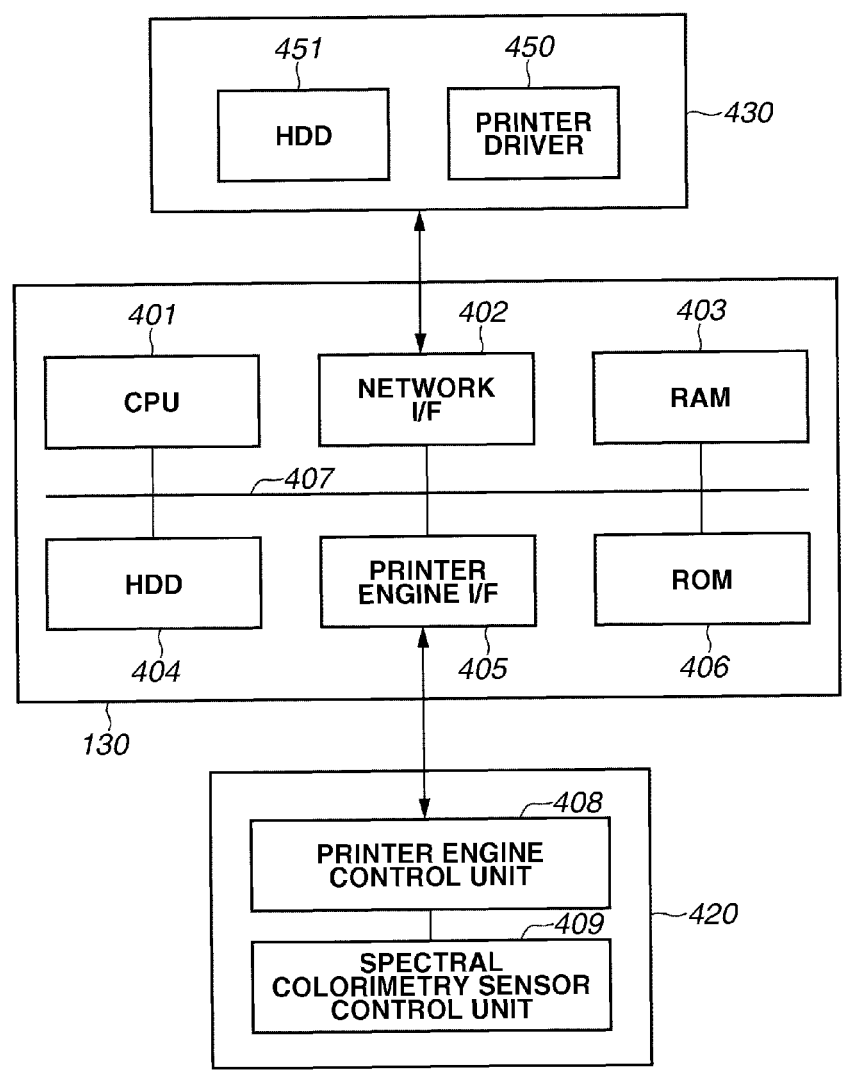
FIG. 4 is a block diagram illustrating a configuration of a controller of the image processing apparatus according to the exemplary embodiments.

FIG. 4 is a block diagram illustrating a configuration of a controller of the image processing apparatus 100 according to the present exemplary embodiment.

A central processing unit (CPU) 401 executes a program loaded in a random access memory (RAM) 403 to manage control of each unit and calculations in the image processing apparatus 100. The RAM 403 is used as a program storage area, a temporary storage for various data, and a work memory. A hard disk drive (HDD) 404 is a mass-storage device for storing various control programs to be executed by the CPU 401. The HDD 404 is also used as a temporary storage area for various data to be subjected to the processing. A read-only memory (ROM) 406 is a storage device for storing an activation processing program of the image processing apparatus 100 and nonvolatile data. When the power of the image processing apparatus 100 is turned ON, the activation processing program stored in the ROM 406 is activated, and an operating system (OS) and a control program stored in the HDD 404 are read and loaded into the RAM 403. Then, the CPU 401 executes processing according to the program loaded into the RAM 403 to execute various control processing (described below). A network interface (I/F) 402 performs communication with other apparatuses, such as a client computer 430, via an external network. A printer engine interface (I/F) 405 manages communication with and control of a printer engine 420. A system bus 407 connects the CPU 401 with each of the above-described units, and transmits control signals, addresses, and data.

The printer engine 420 includes a printer engine control unit 408 for managing control of the development station 101 and the fixing station 102 illustrated in FIG. 1, and a spectral colorimetry sensor control unit 409 for managing control of the above-described spectral colorimetry sensors 170.

The client computer 430 is provided with a HDD 451 and a printer driver 450 installed therein. The printer driver 450 converts a drawing instruction from the client computer 430 into page description language (PDL) data that can be output by the image processing apparatus 100. Further, the printer driver 450 appends various settings for the image processing apparatus 100 to the above-described PDL data, and transmits the PDL data to the image processing apparatus 100.

(Software Module Configuration)

Figure 5:
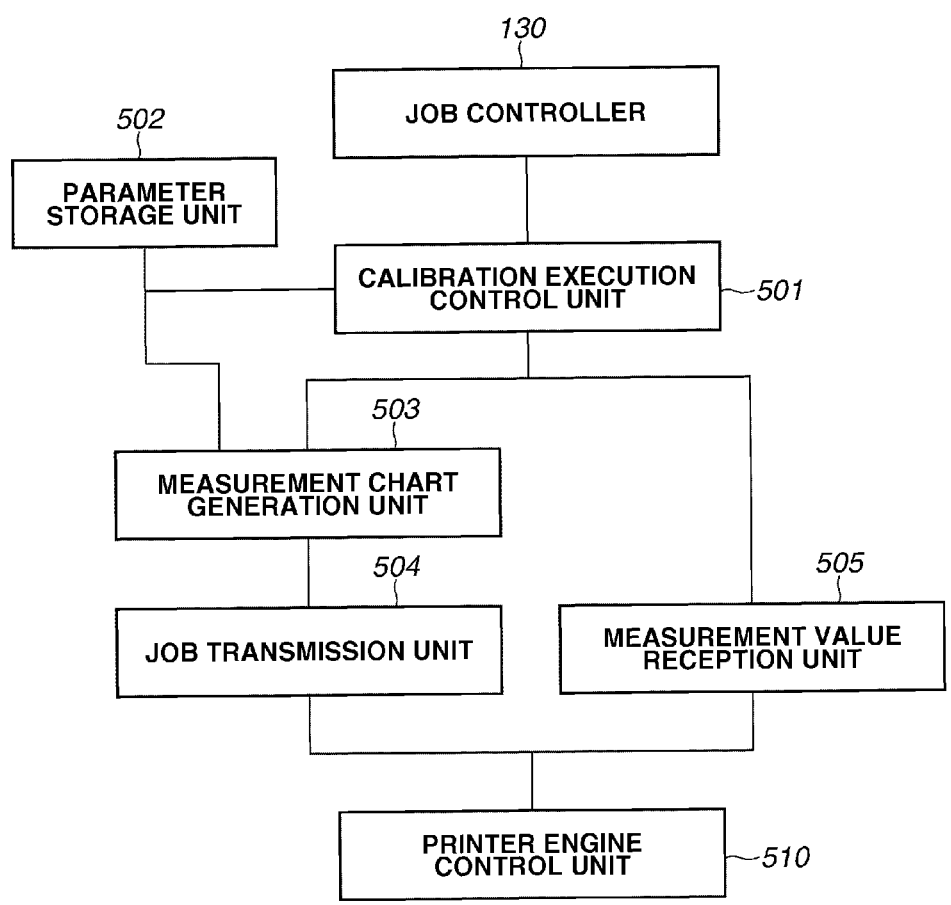
FIG. 5 is a block diagram illustrating software modules according to the exemplary embodiments.

FIG. 5 is a block diagram illustrating a configuration of software modules according to the present exemplary embodiment.

Function of each software module is performed when the CPU 401 executes a control program loaded in the RAM 403.

The job controller 130 is a module for managing master control of the image processing apparatus 100.

A calibration execution control unit 501 is a module for managing master control of calibration execution.

A parameter storage unit 502 reads and stores parameters associated with calibration execution from/in the RAM 403, the ROM 406, and the HDD 404.

A measurement chart generation unit 503 generates a measurement chart image for calibration based on an instruction of the calibration execution control unit 501. A job transmission unit 504 transmits the measurement chart image generated by the measurement chart generation unit 503 to the printer engine control unit 510 which forms an image on a sheet of a specified type.

A measurement value reception unit 505 receives from the printer engine control unit 510 a color value measured via the spectral colorimetry sensor control unit 409.

(Measurement Chart)

Figure 9:
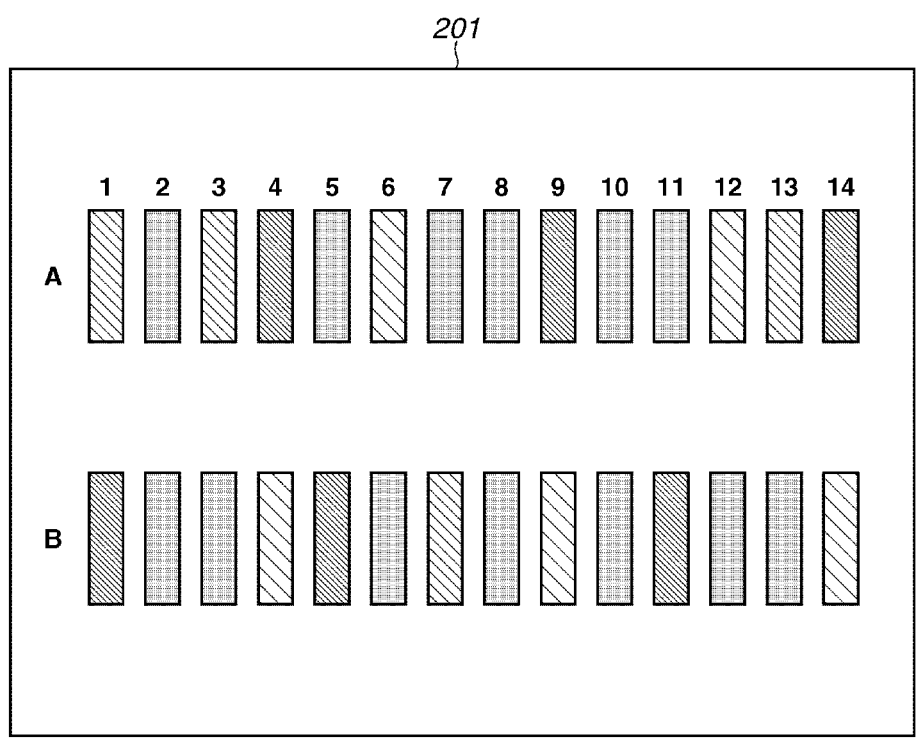
FIG. 9 illustrates a measurement chart to be measured by the spectral colorimetry sensors according to the exemplary embodiments.

FIG. 9 is a measurement chart measured by the spectral colorimetry sensors 170 according to the present exemplary embodiment.

Patch images A and B are arranged in two different rows corresponding to the two spectral colorimetry sensors 170 vertically disposed with respect to the sheet conveyance direction. A total of 14 patch images, for example, are arranged in each of the two rows of patch images. Referring to FIG. 9, although the two rows A and B and patch numbers 1 to 14 are printed, these characters do not need to be printed on the actual measurement chart.

FIGS. 8A and 8B are patch image configuration tables illustrating measurement charts to be measured by the spectral colorimetry sensors 170 according to the present exemplary embodiment.

A measurement patch image configuration table 801 for calibration illustrated in FIG. 8A defines in a data header a sheet type (a calibration target sheet type) on which a correction lookup table (LUT) is to be formed, a measurement chart type, the number of measurement charts, and a permissible color difference. The permissible color difference may be a blank.

Sheets differ in size, grammage, surface nature, and chromaticity for each sheet type. Even if the characteristics of the image processing apparatus 100 are same, when sheets of different types are used for printing, reproduction characteristics become different in the printing. Therefore, the image processing apparatus 100 has a target value for each sheet type, executes calibration for correcting the reproduction characteristics so that an output value coincides with the target value, and stores a correction LUT generated each time calibration is executed. By executing calibration in this way, a correction LUT generated by using a suitable target value can be applied to each sheet type used for printing. This reduces the effect on the reproduction characteristics due to the difference in sheet type.

Following the data header, the measurement patch image configuration table 801 defines for each patch image a desired CMYK signal value and target values (a density value (a target density) and a color value (a target L*a*b* value)) when image formation is performed based on the CMYK signal value. Both the target density value and the target L*a*b* value may not necessarily be defined. These target values are also determined for each sheet type.

A measurement patch image configuration table 802 for status check illustrated in FIG. 8B has a similar data format to the measurement patch image configuration table 801 for calibration. The sheet type may be a predetermined specific sheet type or a general sheet attribute as in the measurement patch image configuration table 802. The measurement patch image configuration table 802 differs from the measurement patch image configuration table 801 in that the measurement chart type is a status check chart, and that patch images are configured such that the number of measurement charts is smaller than the number of status check charts because measurement is performed for status check. In definition of a patch image configuration, measuring points are selected discretely and uniformly within a reproducible color gamut of the image processing apparatus 100. A permissible color difference can be specifically defined for each sheet type. However, a predetermined permissible color difference common to all sheet types is applied when a field is blank.

When a measurement chart is generated by using a calibration target sheet type with reference to FIG. 8A, a status check chart is generated by using a predetermined sheet type with reference to FIG. 8B.

The sheet type used to generate a measurement chart and a sheet type used to generate a status check chart may be identical or a predetermined combination of sheet types.

Further, the number of measurement charts may be the same as the number of status check charts, and the same charts may be used.

FIG. 18 illustrates a measurement chart count table for associating the calibration type with the measurement chart according to the present exemplary embodiment.

A measurement chart count table 1801 defines the number of measurement chart images output and measured with respect to the calibration type which indicates a different correction target. As described above, multicolor calibration and automatic ICC profile generation uses a number of measurement charts compared with conventional monochromatic calibration and main scanning unevenness correction.

FIG. 10 illustrates a sheet database according to the present exemplary embodiment.

A sheet database 1001 is a database in which sheet characteristic parameters and sheet-specific image forming conditions are registered. The sheet database 1001 is preregistered in the image processing apparatus 100, or can be registered afterwards by the operator via the operation unit 150. Parameters, such as grammage and surface nature, and the waiting time for cooling in the measurement by the spectral colorimetry sensors 170 are registered in the sheet database 1001. The waiting time for cooling is a duration of time to acquire a measurement result in which the effect of thermochromism is suppressed, when the color value of patch images on a chart generated on a sheet is measured by the spectral colorimetry sensors 170. When registering a new sheet in the sheet database 1001, an optimum waiting time for cooling the sheet can be registered. The waiting time for cooling in the sheet database 1001 may be blank. In this case, the waiting time for cooling is determined based on a waiting-time-for-cooling correspondence table 601 illustrated in FIG. 6. As illustrated in the waiting-time-for-cooling correspondence table 601, the time to cool a sheet increases when grammage of the sheet increases. Thus, the waiting time for cooling the sheet is obtained based on the grammage of the sheet.

(Printing Flow)

The following describes control of an image processing apparatus 100 according to a first exemplary embodiment.

Figure 11:
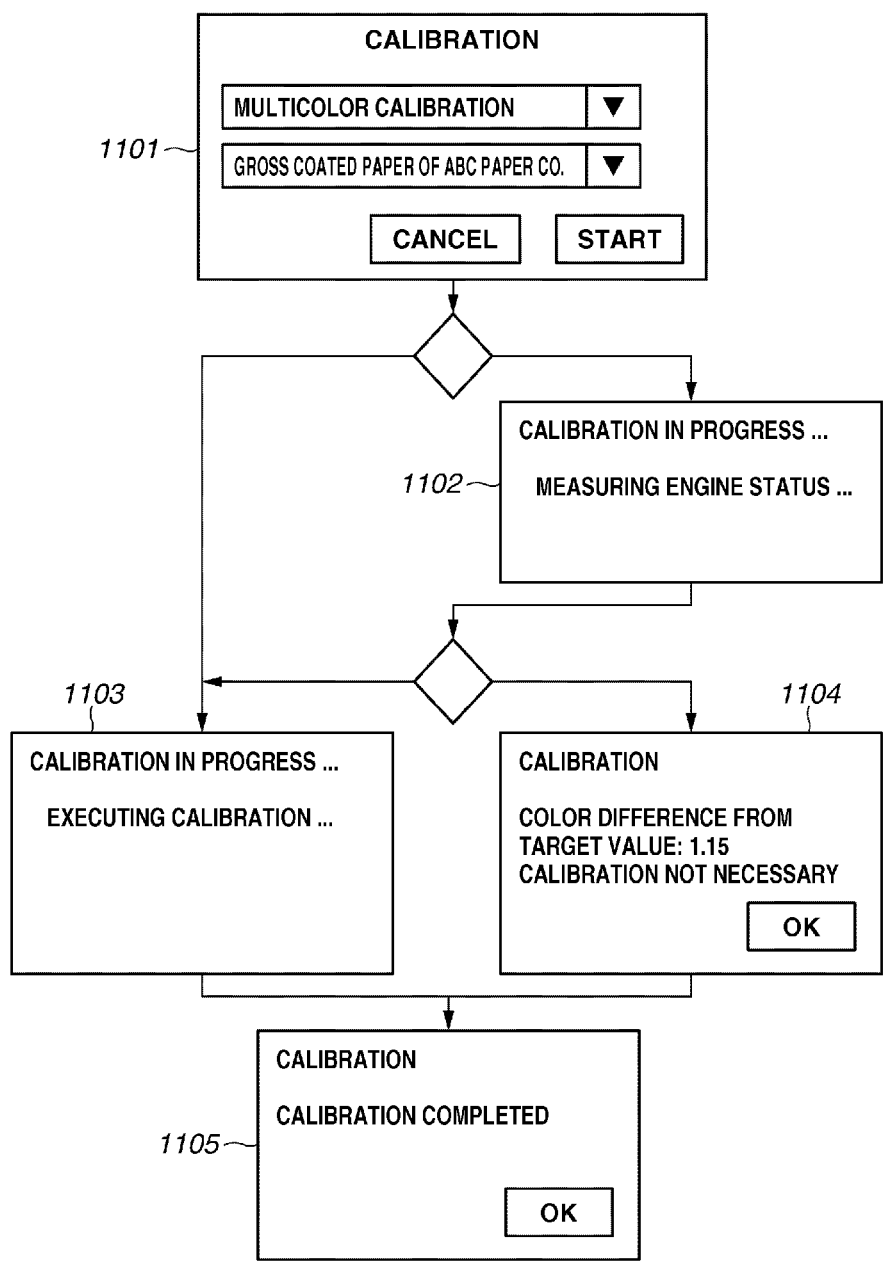
FIG. 11 is a flowchart illustrating a transition of user interface (UI) screens displayed on an operation unit of the image processing apparatus according to the exemplary embodiments.

FIG. 11 is a flowchart illustrating a transition of UI screens displayed on the operation unit 150 of the image processing apparatus 100 according to the present exemplary embodiment.

Figure 17:
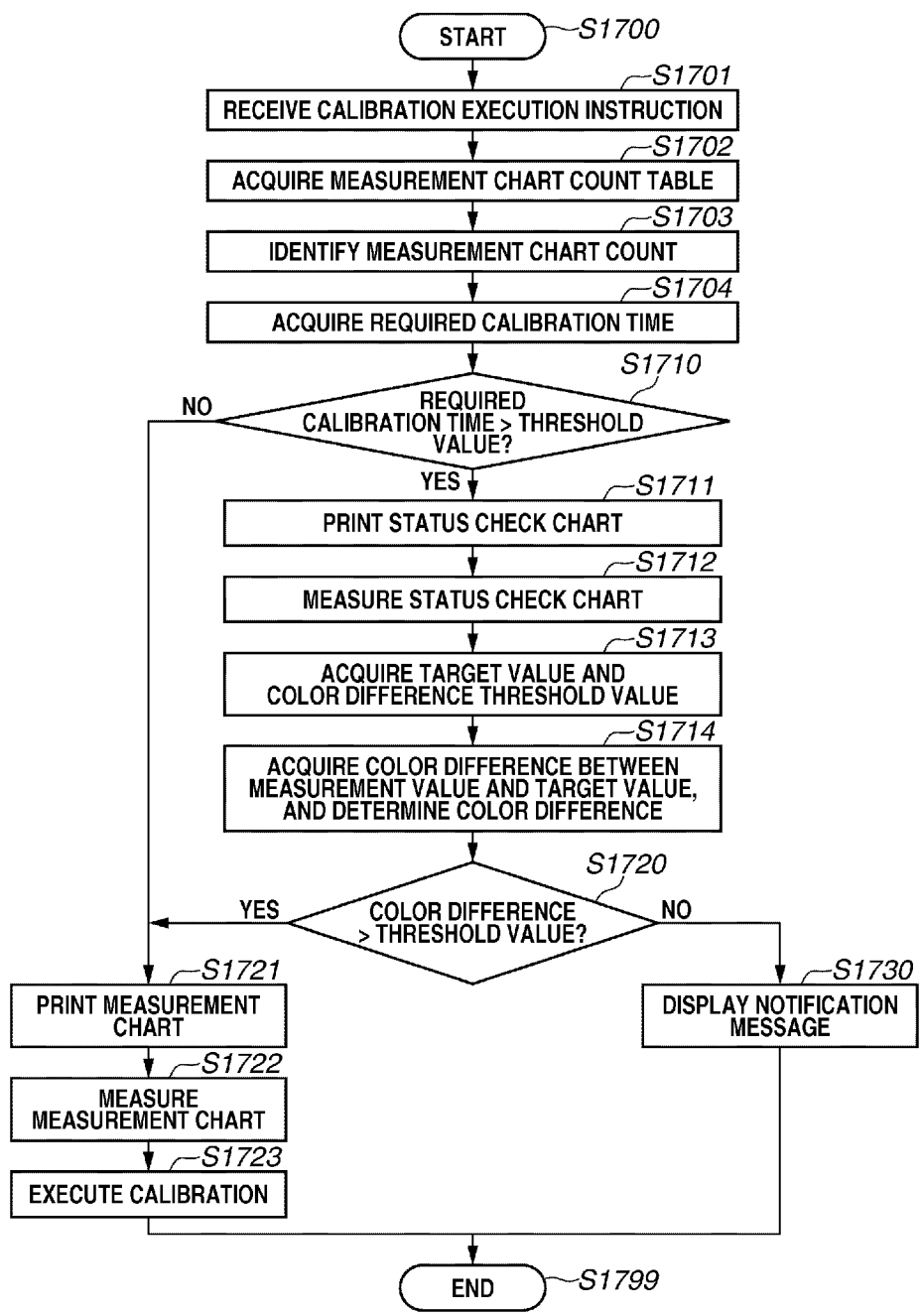
FIG. 17 is a flowchart illustrating control processing by the controller of the image processing apparatus according to the first exemplary embodiment.

FIG. 17 is a flowchart illustrating control processing by the job controller 130 of the image processing apparatus 100 according to the first exemplary embodiment. A control program for executing this processing is loaded in the RAM 403 as described above. Processing in this flowchart is carried out when the CPU 401 executes this control program.

In step S1700, processing by the job controller 130 is started. In a UI screen 1101, the operator selects a calibration type and a sheet type (calibration target sheet type) for which a correction table is generated, and starts executing calibration. In step S1701, the calibration execution control unit 501 receives a calibration execution instruction for the calibration target sheet type. The calibration execution instruction includes information about the calibration type and the calibration target sheet type selected by the operator in the UI screen 1101. In step S1702, the calibration execution control unit 501 acquires the measurement chart count table 1801 via the parameter storage unit 502. In step S1703, the calibration execution control unit 501 identifies the number of measurement charts based on the calibration type received in step S1701 and the acquired measurement chart count table 1801. In step S1704, the calibration execution control unit 501 obtains the time to execute calibration based on the identified number of measurement charts, the internal state of the image processing apparatus 100 acquired from the parameter storage unit 502, and the measurement time. Specifically, by using the sheet database 1001 illustrated in FIG. 10, the calibration execution control unit 501 acquires a waiting time necessary for cooling which enables measurement, after a measurement chart on a sheet of the selected sheet type has been fixed. By using the acquired waiting time for cooling per sheet, the calibration execution control unit 501 acquires a waiting time for cooling a certain number of sheets.

In step S1710, the calibration execution control unit 501 compares the threshold value of the time to automatically execute calibration acquired from the parameter storage unit 502 with the acquired time to execute calibration. When the calibration time is determined to be larger than the threshold value (YES in step S1710), the processing proceeds to step S1711. Otherwise, when the calibration time is determined to be smaller than the threshold value (NO in step S1710), the processing proceeds to step S1721.

In step S1704, the calibration execution control unit 501 instructs the measurement chart generation unit 503 to generate and print the status check chart by using a sheet of the same type as the sheet type selected as a calibration target sheet type. At the same time, the calibration execution control unit 501 instructs the job controller 130 to display a UI screen 1102. The measurement chart generation unit 503 reads from the parameter storage unit 502 the measurement patch image configuration table 802 for status check corresponding to the calibration target sheet type, and generates a measurement chart based on the defined patch CMYK value. Then, the measurement chart generation unit 503 instructs the job transmission unit 504 to print the generated status check chart. The job transmission unit 504 instructs the printer engine control unit 510 to print the generated status check chart by using the calibration target sheet. The printer engine control unit 510 prints the generated status check chart by using a sheet of the same type as the calibration target sheet. The job controller 130 displays the UI screen 1102 on the operation unit 150.

In step S1712, the calibration execution control unit 501 instructs the measurement value reception unit 505 to measure the printed status check chart. The measurement value reception unit 505 instructs the printer engine control unit 510 to measure the printed status check chart. The printer engine control unit 510 measures the printed status check chart, and notifies the calibration execution control unit 501 of the measurement value via the measurement value reception unit 505.

In step S1713, the calibration execution control unit 501 reads from the parameter storage unit 502 the measurement patch image configuration table 802 for status check corresponding to the calibration target sheet. The calibration execution control unit 501 acquires from the measurement patch image configuration table 802 target values for each patch image constituting the status check chart and a threshold value of the permissible color difference.

In step S1714, the calibration execution control unit 501 acquires a color difference corresponding to each patch image based on the measurement value acquired in step S705 and the target color value acquired in step S706, and determines whether the acquired color difference exceeds the threshold value.

Figure 13:
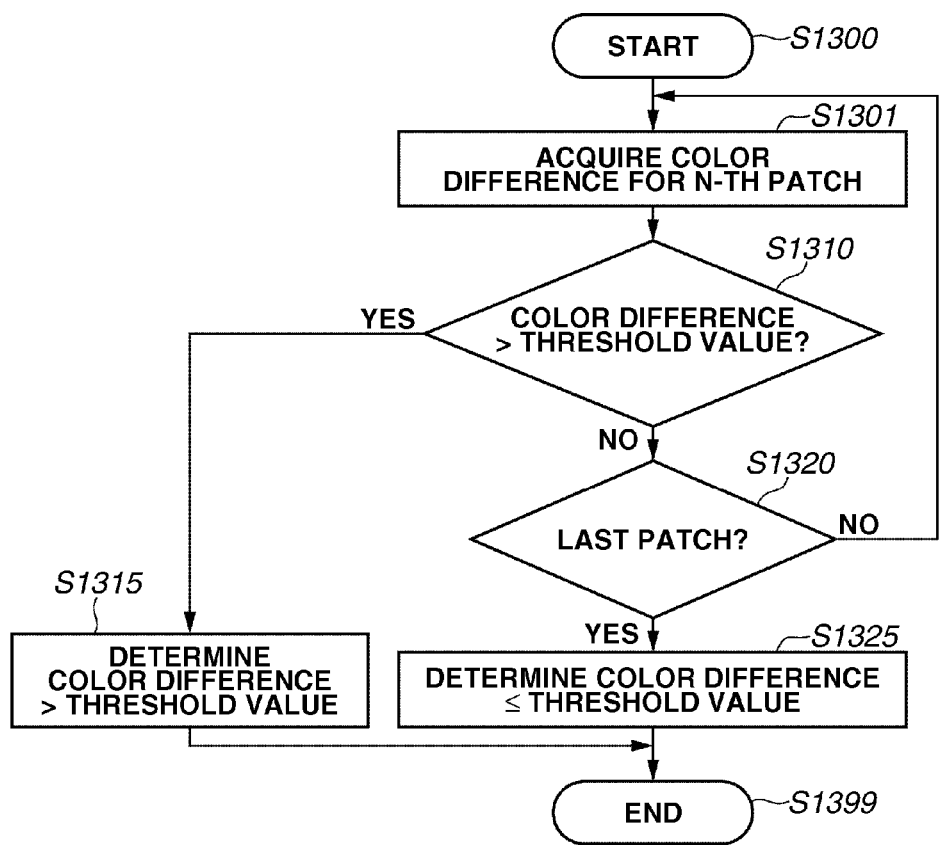
FIG. 13 is a flowchart illustrating a color difference determination routine by a calibration execution control unit of an image processing apparatus according to a first exemplary embodiment.

FIG. 13 is a flowchart illustrating a color difference determination routine by the calibration execution control unit 501 of the image processing apparatus 100 according to the present first exemplary embodiment.

In step S1300, the calibration execution control unit 501 starts the color difference determination routine. In step S1301, the calibration execution control unit 501 acquires a color difference based on the N-th target color value of the measurement patch image configuration table 802 acquired in step S1713 and the measurement value of the N-th patch image received in step S1712. In step S1310, the calibration execution control unit 501 determines whether the acquired color difference exceeds the threshold value of the permissible color difference acquired in step S1713. When the color difference is determined to exceed the threshold value (YES in step S1310), the processing proceeds to step S1315. When the color difference is determined to fall below the threshold value (NO in step S1310), the processing proceeds to step S1320. In step S1320, the calibration execution control unit 501 determines whether the patch image currently in a process of the determination is the last patch image defined in the measurement patch image configuration table 802. When the current patch image is determined to be the last patch image (YES in step S1320), the processing proceeds to step S1325. When the current patch image is determined to be not the last patch image (NO in step S1320), the processing returns to step S1301 to continue color difference acquisition for the following patch image.

In step S1315, the calibration execution control unit 501 determines that the color difference exceeds the threshold value of the permissible color difference, and the processing proceeds to step S1399 to exit the color difference determination routine.

In step S1325, as a result of evaluating the color difference for all patch images, the calibration execution control unit 501 determines that the color difference for any patch image does not exceed the threshold value, and the processing proceeds to step S1399 to exit the color difference determination routine.

In step S1720, the calibration execution control unit 501 determines whether the color difference for each patch image exceeds the threshold value, from a result of the evaluation in step S1714. When the color difference for a certain patch image is determined to exceed the threshold value (YES in step S1720), the processing proceeds to step S1721. When the color difference for any patch image does not exceed the threshold value (NO in step S1720), the processing proceeds to step S1730.

In step S1721, the calibration execution control unit 501 instructs the measurement chart generation unit 503 to generate and print a measurement chart. A sheet of the calibration target type is used to print this measurement chart. Thus, a correction table for the used sheet type is generated.

At the same time, the calibration execution control unit 501 instructs the job controller 130 to display a UI screen 1103. The measurement chart generation unit 503 reads from the parameter storage unit 502 the measurement patch image configuration table 801 for defining a correction table for each sheet type, and generates a measurement chart based on the defined patch CMYK value. Then, the measurement chart generation unit 503 instructs the job transmission unit 504 to print the generated measurement chart for calibration. The job transmission unit 504 instructs the printer engine control unit 510 to print the generated measurement chart for calibration by using a sheet of the calibration target type. The printer engine control unit 510 prints the generated measurement chart for calibration on a sheet classified into the calibration target type.

The job controller 130 displays the UI screen 1103 on the operation unit 150.

In step S1722, the calibration execution control unit 501 acquires from the measurement value reception unit 505 the color value of the printed measurement chart for calibration.

In step S1722, the calibration execution control unit 501 instructs the measurement value reception unit 505 to measure the printed measurement chart. The measurement value reception unit 505 instructs the printer engine control unit 510 to measure the printed measurement chart. The printer engine control unit 510 measures the printed measurement chart, and notifies the calibration execution control unit 501 of a measurement value via the measurement value reception unit 505.

In step S1723, the calibration execution control unit 501 executes calibration so that the measurement value acquired in step S1722 approaches the target value in the measurement patch image configuration table 801 for calibration.

Figure 12:
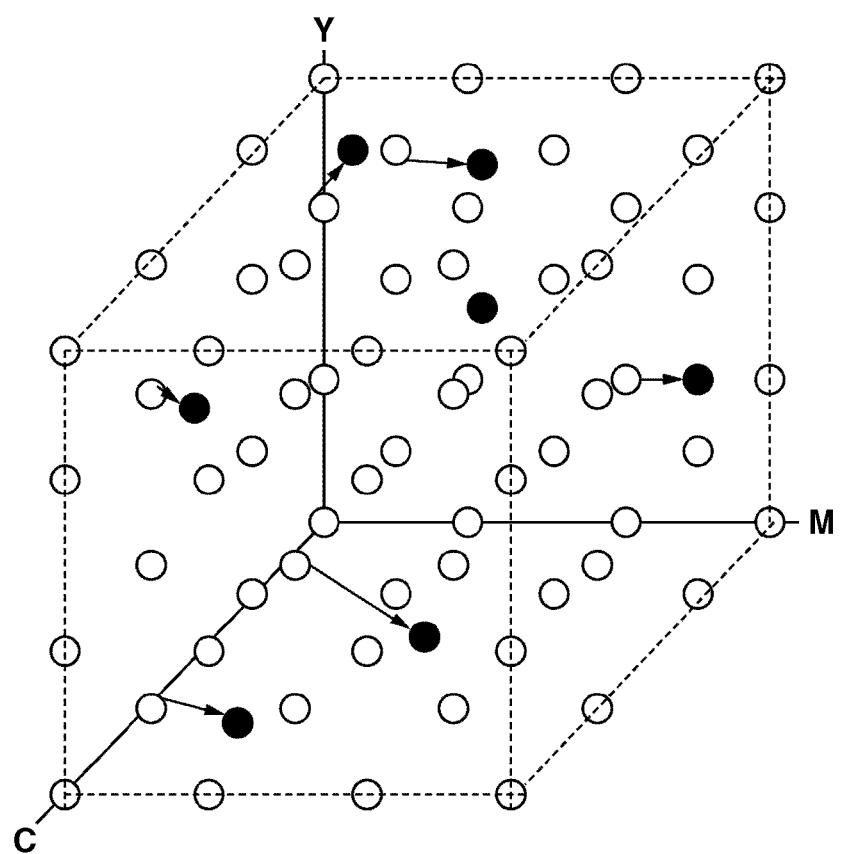
FIG. 12 illustrates a lookup table for calibrations according to the exemplary embodiments.

FIG. 12 illustrates a lookup table (correction table) for calibration according to the present exemplary embodiment.

For example, the calibration execution control unit 501 generates a multi-dimensional lookup table for outputting a corrected CMY signal value from a CMY input value, as illustrated in FIG. 12, and corrects the CMY signal value, thus achieving calibration.

Likewise, the effect of calibration can be obtained also by generating an ICC profile.

In step S1799, the calibration execution control unit 501 displays a UI screen 1105 on the operation unit 150 via the job controller 130 to indicate that calibration is completed.

In step S1730, the calibration execution control unit 501 instructs the job controller 130 to display a UI screen 1104 to indicate that execution of calibration is not necessary. The job controller 130 displays the UI screen 1104 on the operation unit 150, and the processing proceeds to step S1799 to exit the color difference determination routine.

By performing control in this way, execution of calibration can be controlled using the result of measuring the status check chart in a case where time-consuming calibration is executed. Specifically, control can be performed not to execute time-consuming calibration when the necessity of executing calibration is determined to be low. Thus, the time to execute calibration can be reduced.

In the first exemplary embodiment, when the color difference between the measurement value and the target value falls below the threshold value as a result of measuring the status check chart, calibration execution is prevented. However, calibration may be executed according to an operator's instruction even when the color difference falls below the threshold value. A second exemplary embodiment will be described below based on a technique for allowing the operator to execute calibration even when the color difference between the target value and the measurement result falls below the threshold value.

Figure 14:
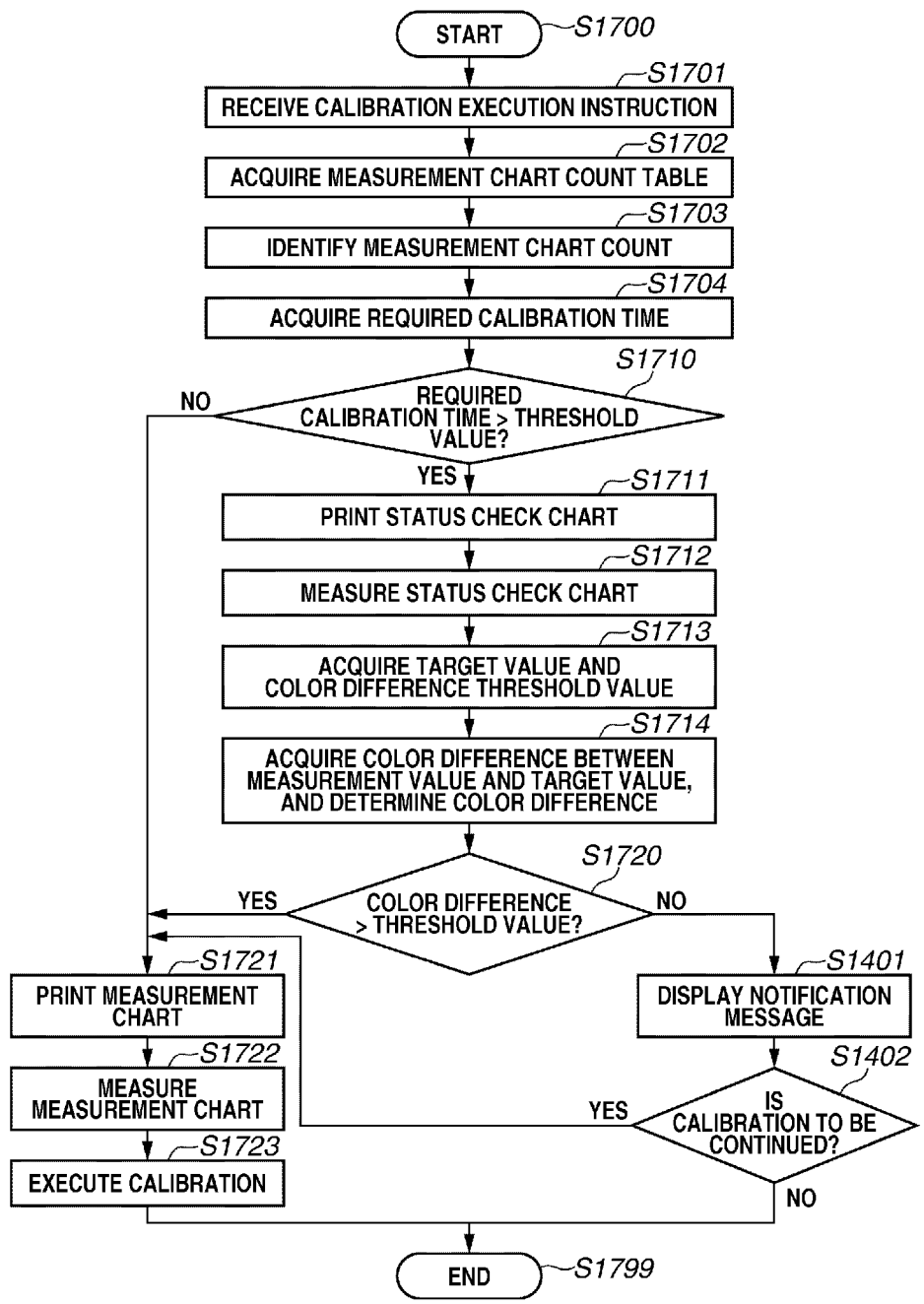
FIG. 14 is a flowchart illustrating control processing by a controller of an image processing apparatus according to a second exemplary embodiment.

FIG. 14 is a flowchart illustrating control processing by the job controller 130 of the image processing apparatus 100 according to the second exemplary embodiment. In the present second exemplary embodiment, the job controller 130 of the image processing apparatus 100 performs the same control processing as the processing in steps S1700 to S1723 of the flowchart illustrated in FIG. 17 according to the first exemplary embodiment. Steps S1720, S1401, and S1402 according to the present second exemplary embodiment will be described in detail below.

In step S1720, the calibration execution control unit 501 determines whether the color difference between the measurement result for each patch image and the target value acquired in step S1714 exceeds the threshold value acquired in step S1713. When the color difference is determined to exceed the threshold value (YES in step S1720), the processing proceeds to step S1721. When the color difference is determined to fall below the threshold value (NO in step S1720), the processing proceeds to step S1401.

FIG. 15 illustrates a UI screen 1501 displayed on the operation unit 150 of the image processing apparatus 100 according to the present second exemplary embodiment.

In step S1401, the calibration execution control unit 501 instructs the job controller 130 to display the UI screen 1501 for notifying that the necessity of calibration is low. The job controller 130 displays the message of the UI screen 1501 on the operation unit 150, and transmits an operator's instruction specifying continuation or termination of calibration to the calibration execution control unit 501. In step S1402, the calibration execution control unit 501 evaluates the received calibration execution instruction. When the instruction is evaluated as instruction for continuation of calibration (YES in step S1402), the processing proceeds to step S1721. Then, the calibration execution control unit 501 executes similar processing to steps S1721 to S1723 according to the first exemplary embodiment, and the processing proceeds to step S1799 to exit the color difference determination routine. When the instruction is evaluated as instruction for termination of calibration (NO in step S1402), the processing proceeds to step S1799 to exit the color difference determination routine similar to the first exemplary embodiment.

By performing control in this way, calibration involving longer processing time than a predetermined duration of time can be executed according to an operator's instruction even when the color difference between the measurement value of the status check chart and the target value falls below the threshold value.

In the first and the second exemplary embodiments, calibration execution is prevented when the color difference between the measurement result of each patch image and the target value falls below the threshold value. In this case, if a singular point, such as dust adhering to the chart, is picked out at the time of chart measurement, only a patch image measured under the effect of the dust will show a color difference between the measurement result and the target value exceeding the threshold value. Thus, it is determined to execute time-consuming calibration. A third exemplary embodiment will be described below based on a method for determining the necessity of calibration not by using the color difference between the measurement result and the target value but by using an average color difference of all patch images.

In a third exemplary embodiment, the job controller 130 of the image processing apparatus 100 performs the same control as the processing of the flowchart illustrated in FIG. 17 according to the first exemplary embodiment or as the processing of the flowchart illustrated in FIG. 14 according to the second exemplary embodiment. The following describes in detail a method for calculating and determining the color difference between the measurement value and the target value in step S1714 according to the present second exemplary embodiment.

Figure 16:
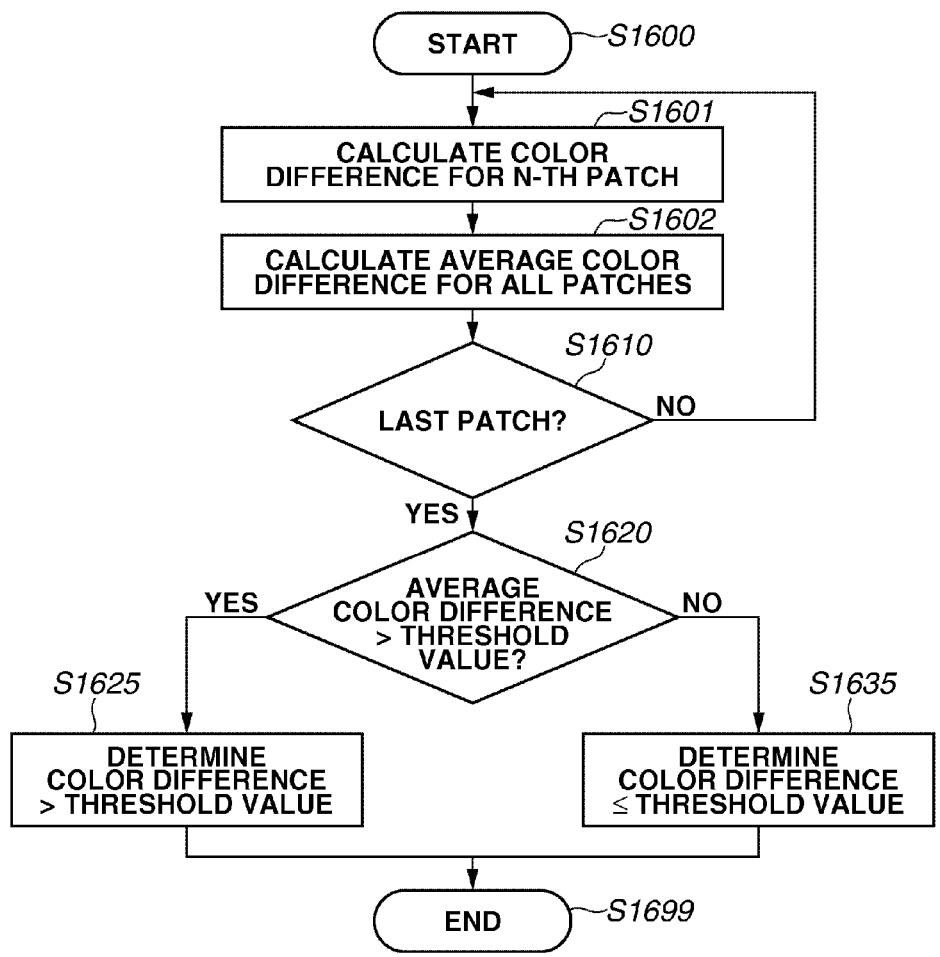
FIG. 16 is a flowchart illustrating a color difference determination routine by a calibration execution control unit of an image processing apparatus according to a third exemplary embodiment.

FIG. 16 is a flowchart illustrating the color difference determination routine by the calibration execution control unit 501 of the image processing apparatus 100 according to the present third exemplary embodiment.

In step S1600, the calibration execution control unit 501 starts the color difference determination routine. In step S1601, the calibration execution control unit 501 acquires a color difference based on the target value of the N-th patch image in the measurement patch image configuration table 802 acquired in step S706 and the measurement value of the N-th patch image received in step S705. In step S1602, the calibration execution control unit 501 acquires an average value of the color difference acquired in step S1601 and the color differences for the first to the N-th patch images.

In step S1610, the calibration execution control unit 501 determines whether the current patch image subjected to the average color difference acquisition is the last patch image defined in the measurement patch image configuration table 802. When the current patch image is determined to be the last patch image (YES in step S1610), the processing proceeds to step S1620. When the current patch image is determined to be not the last patch image (NO in step S1610), the processing returns to step S1601 to continue the color difference acquisition for the following patch image.

In step S1620, the calibration execution control unit 501 determines whether the acquired average color difference exceeds the threshold value of the permissible color difference acquired in step S1713. When the average color difference is determined to exceed the threshold value (YES in step S1620), the processing proceeds to step S1625. When the average color difference is determined to fall below the threshold value (NO in step S1620), the processing proceeds to step S1635.

In step S1625, the calibration execution control unit 501 determines that the average color difference exceeds the threshold value of the permissible color difference, and the processing proceeds to step S1699 to exit the color difference determination routine.

In step S1635, the calibration execution control unit 501 determines that the average color difference does not exceed the threshold value of the permissible color difference, and the processing proceeds to step S1699 to exit the color difference determination routine.

By performing control in this way, control can be performed not to execute time-consuming calibration when the average color difference of all patch images falls below the threshold value and therefore the necessity of calibration is determined to be low.

Thus, it becomes possible to check the determination to execute time-consuming calibration because of a reading error at the time of measuring the measurement chart.

In the above-described first to the third exemplary embodiments, the time of calibration is calculated based on the number of measurement charts, and, when the time exceeds the threshold value, the status check chart is measured, thus preventing the number of times of calibration execution from increasing. However, as described above, the increase in calibration time is predominantly affected by the waiting time for cooling of a sheet rather than by the number of measurement charts. In particular, thick paper has a large grammage, therefore, because of its large heat capacity, calibration time is remarkably affected by the waiting time for cooling.

According to a fourth exemplary embodiment described below, the necessity of calibration is determined by using the status check chart, based on the waiting time for cooling of a sheet.

FIG. 6 illustrates a table for associating with the sheet grammage range the waiting time for cooling for the spectral colorimetry sensors 170 to read a measurement chart, according to the fourth exemplary embodiment.

The waiting-time-for-cooling correspondence table 601 defines a sheet grammage range of the measurement chart 201 to be measured, and a waiting time for cooling until a sheet within the grammage range reaches the temperature measurable by the spectral colorimetry sensors 170 which prevents the effect of thermochromism. For example, when the sheet grammage of the measurement chart 201 is 180 g/m2, the spectral colorimetry sensors 170 wait for 20 seconds for each sheet at the lower end of the reversing unit 140 during measurement.

FIG. 7 is a flowchart illustrating control processing by the job controller 130 of the image processing apparatus 100 according to the fourth exemplary embodiment.

In the present fourth exemplary embodiment, the job controller 130 of the image processing apparatus 100 performs the same control processing as the processing in steps S1700, S1701, and S1711 to S1799 of the flowchart illustrated in FIG. 17 according to the first exemplary embodiment or the flowchart illustrated in FIG. 14 according to the second exemplary embodiment. The following describes in detail a method for determining whether a waiting time for cooling of a sheet occurs in steps S1700 to S702 according to the present fourth exemplary embodiment.

In step S1700, processing by the job controller 130 is started. In the UI screen 1101, the operator selects a calibration target sheet type, and starts executing calibration. In step S1701, the calibration execution control unit 501 receives an instruction to execute calibration of the calibration target sheet. In step S701, the calibration execution control unit 501 refers to the waiting-time-for-cooling correspondence table 601 and the sheet database 1001 via the parameter storage unit 502. Based on the sheet type specified by the calibration execution instruction, the calibration execution control unit 501 acquires a waiting time for cooling for the relevant sheet defined in the above-described waiting-time-for-cooling correspondence table 601 or the sheet database 1001. In step S702, the calibration execution control unit 501 determines whether the acquired waiting time for cooling is larger than zero, i.e., whether a waiting time for cooling will occur for the relevant sheet. When a waiting time for cooling is determined to occur (YES in step S702), the processing proceeds to step S1711. When a waiting time for cooling is determined not to occur (NO in step S702), the processing proceeds to step S1721.

Subsequently, the calibration execution control unit 501 performs similar processing to the first exemplary embodiment. When a waiting time for cooling is determined to occur (YES in step S702), the calibration execution control unit 501 measures the status check chart, and, only when the color difference between the measurement result and the target value exceeds the threshold value, executes calibration. When a waiting time for cooling is determined to not be necessary (NO in step S702), the calibration execution control unit 501 executes regular calibration, and the processing exits this flowchart.

As described above, when executing calibration based on the result of measurement by the spectral colorimetry sensors 170 using a sheet classified into the type using a waiting time for cooling, control can be performed not to execute time-consuming calibration if the necessity of calibration is low.

According to the fourth exemplary embodiment, in the calibration for a sheet type using a waiting time for cooling, a method of printing a status check chart by using a sheet classified into the same type, measuring the status check chart, and determining the necessity of calibration based on an acquired color difference is employed. However, even when only one status check chart is used, if the status check chart is printed on a sheet having a large sheet grammage and a large heat capacity, the waiting time for cooling cannot be ignored. On the other hand, characteristics variation in the image processing apparatus 100 is predominantly affected by sheet-independent variation than by sheet-specific variation. Specifically, in many cases, variation in the reproduction characteristics, such as tint and density, which is observed in a sheet of a certain type, is also observed in a sheet of another type. The opposite is equally true in many cases. Namely, variation of reproduction characteristics which is not observed in a sheet of a certain type is not observed in a sheet of another type.

Therefore, in a fifth exemplary embodiment, even if the calibration target sheet type is a type using a waiting time for cooling, a sheet type using no or a short waiting time for cooling, i.e., a sheet having a small grammage, is used when forming a status check chart.

This technique enables omitting or reducing a waiting time required to measure the status check chart.

FIG. 19 is a flowchart illustrating control processing by the job controller 130 of the image processing apparatus 100 according to a fifth exemplary embodiment.

In the present fifth exemplary embodiment, the job controller 130 of the image processing apparatus 100 performs the same control processing as the processing in steps S1700 to S702 and steps S1711 to S1799 of the flowchart illustrated in FIG. 7 according to the fourth exemplary embodiment. The following describes in detail a method for determining whether a waiting time for cooling of a sheet occurs in steps S702, S1901, and S1711 according to the present fifth exemplary embodiment.

In step S702, the calibration execution control unit 501 determines whether the acquired waiting time for cooling is larger than zero, i.e., a waiting time for cooling occurs with respect to the sheet used at the time of the calibration (the sheet for which a corresponding correction table is generated). When a waiting time for cooling is determined to occur (YES in step S702), the processing proceeds to step S1901.

In step S1901, the calibration execution control unit 501 refers to the waiting-time-for-cooling correspondence table 601 via the parameter storage unit 502, and selects a sheet type having a grammage requiring a minimum waiting time for cooling, out of the sheets stored in the image processing apparatus 100. Then, the calibration execution control unit 501 acquires the measurement patch image configuration table 802 for status check corresponding to the relevant sheet type. This sheet type may differ from the sheet type used at the time of calibration execution, and a sheet type having a minimum grammage is used among the stored sheets.

In step S1711 and subsequent steps, similar to the fourth exemplary embodiment, the calibration execution control unit 501 measures the status check chart by using the alternative sheet selected in step S1901, and, only when the color difference between the measurement value and the target value exceeds the threshold value, executes calibration. When a waiting time for cooling is determined to be not required (NO in step S702), the calibration execution control unit 501 executes regular calibration, and the processing exits the flowchart.

By performing control in this way, status check can be performed by using an alternative sheet type requiring no or a short waiting time for cooling, as the status check chart. Based on the result of status check, it is possible to determine whether calibration is to be executed by using a sheet type requiring a waiting time for cooling.

Further, the time for measuring the status check chart can be reduced.

Although the first to the fifth exemplary embodiments have specifically been described based on calibration using sensors included within the image processing apparatus 100, the same effect can be obtained even if the sensors are not included therein.

Although the first to the fifth exemplary embodiments have specifically been described based on control processing by the job controller 130 included within the image processing apparatus 100, the control processing may be executed by the client computer 430.

Although the above-described exemplary embodiments have specifically been described based on an electrophotographic apparatus, the image processing apparatus is not limited thereto, and may be an ink jet printer and a thermal printer. The spirit of the present disclosure is not limited to the printer type. Although the above-described exemplary embodiments have specifically been described based on the use of toner in electrophotographic printing as a recording agent, the recording agent used for printing is not limited to toner, and may be other recording agents, such as ink. The spirit of the present disclosure is not limited to the recording agent type.

OTHER EMBODIMENTS

Embodiments of the present disclosure can also be realized by a computer of a system or apparatus that reads out and executes computer executable instructions recorded on a storage medium (e.g., a non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2012-278321, filed Dec. 20, 2012, which is hereby incorporated by reference herein in its entirety.

What is claimed is:

1. An image processing apparatus comprising:
a first determination unit configured to determine whether a difference between a result of measuring a first chart formed by an image forming unit and a target value is larger than a first preset threshold value; and
a control unit configured to, based on a result of determination by the determination unit, control execution of correction of reproduction characteristics of an image formed by the image forming unit by using a result of measuring a second chart formed by the image forming unit and the target value.

2. The image processing apparatus according to claim 1, wherein, when a difference between the result of measuring the second chart and the target value is determined by the determination unit to be smaller than the first threshold value, the control unit performs control not to execute correction of the reproduction characteristics of the image formed by the image forming unit by using the result of measuring the first chart formed by the image forming unit and the target value.

3. The image processing apparatus according to claim 1, wherein, when a difference between the result of measuring the second chart and the target value is determined by the determination unit to be larger than the first threshold value, the control unit performs control to execute correction of the reproduction characteristics of the image formed by the image forming unit by using the result of measuring the first chart formed by the image forming unit and the target value.

4. The image processing apparatus according to claim 1, wherein a value measured at the time of measuring the first chart and the second chart is a value represented by L*a*b*.

5. The image processing apparatus according to claim 1, wherein a value measured at the time of measuring the first chart and the second chart is a value represented by a density value.

6. The image processing apparatus according to claim 1, further comprising:
an acquisition unit configured to acquire a time to execute correction of the reproduction characteristics of the image formed by the image forming unit; and
a second determination unit configured to determine whether the time acquired by the acquisition unit is longer than a preset second threshold value,
wherein, when the time is determined to be longer than the second threshold value by the second determination unit, the first determination unit makes a determination.

7. The image processing apparatus according to claim 6, wherein the acquisition unit acquires a number of sheets to be used to form the first chart, and acquires a time to execute correction with the correction unit using information obtained based on the acquired number of sheets and grammage of the sheets.

8. The image processing apparatus according to claim 1, wherein the first determination unit determines whether an average value of differences between the result of measuring the second chart formed by the image forming unit and the target value is larger than the first threshold value.

9. The image processing apparatus according to claim 1, further comprising:
 a display unit configured to, when the difference between the result of measuring the second chart and the target value is determined by the first determination unit to be larger than the first threshold value, display a message indicating that correction of the reproduction characteristics of the image formed by the image forming unit is not to be executed.

10. The image processing apparatus according to claim 1, further comprising:
 a display unit configured to, when the difference between the result of measuring the second chart and the target value is determined by the first determination unit to be larger than the first threshold value, display a message prompting to select whether correction of the reproduction characteristics of the image formed by the image forming unit is to be executed.

11. The image processing apparatus according to claim 1, wherein the first chart and the second chart are formed on sheets of a same type by the image forming unit.

12. The image processing apparatus according to claim 1, wherein the sheet for the second chart is a sheet of a type having a minimum grammage among stored sheets.

13. The image processing apparatus according to claim 1, wherein the second chart is formed by the image forming unit using a smaller number of sheets than a number of sheets for the first chart.

14. The image processing apparatus according to claim 1, wherein the second chart and the first chart are the same chart.

15. The image processing apparatus according to claim 1, wherein the measurement unit is disposed between a fixing unit and a discharge unit on a sheet conveyance path.

16. An image processing method comprising:
 firstly determining whether a difference between a result of measuring a first chart formed by an image forming unit and a target value is larger than a preset first threshold value; and
 controlling, based on the result of the determination, execution of correction of reproduction characteristics of an image formed by the image forming unit by using a result of measuring a second chart formed by the image forming unit and the target value.

17. A non-transitory computer-readable storage medium storing a program for causing a computer to execute a method comprising:
 firstly determining whether a difference between a result of measuring a first chart formed by an image forming unit and a target value is larger than a preset first threshold value; and
 controlling, based on the result of the determination, execution of correction of reproduction characteristics of an image formed by the image forming unit by using a result of measuring a second chart formed by the image forming unit and the target value.

* * * * *